Aug. 25, 1953     O. SANDBERG     2,649,951
ARTICLE FEED CONTROLLER
Filed May 20, 1950     2 Sheets-Sheet 1
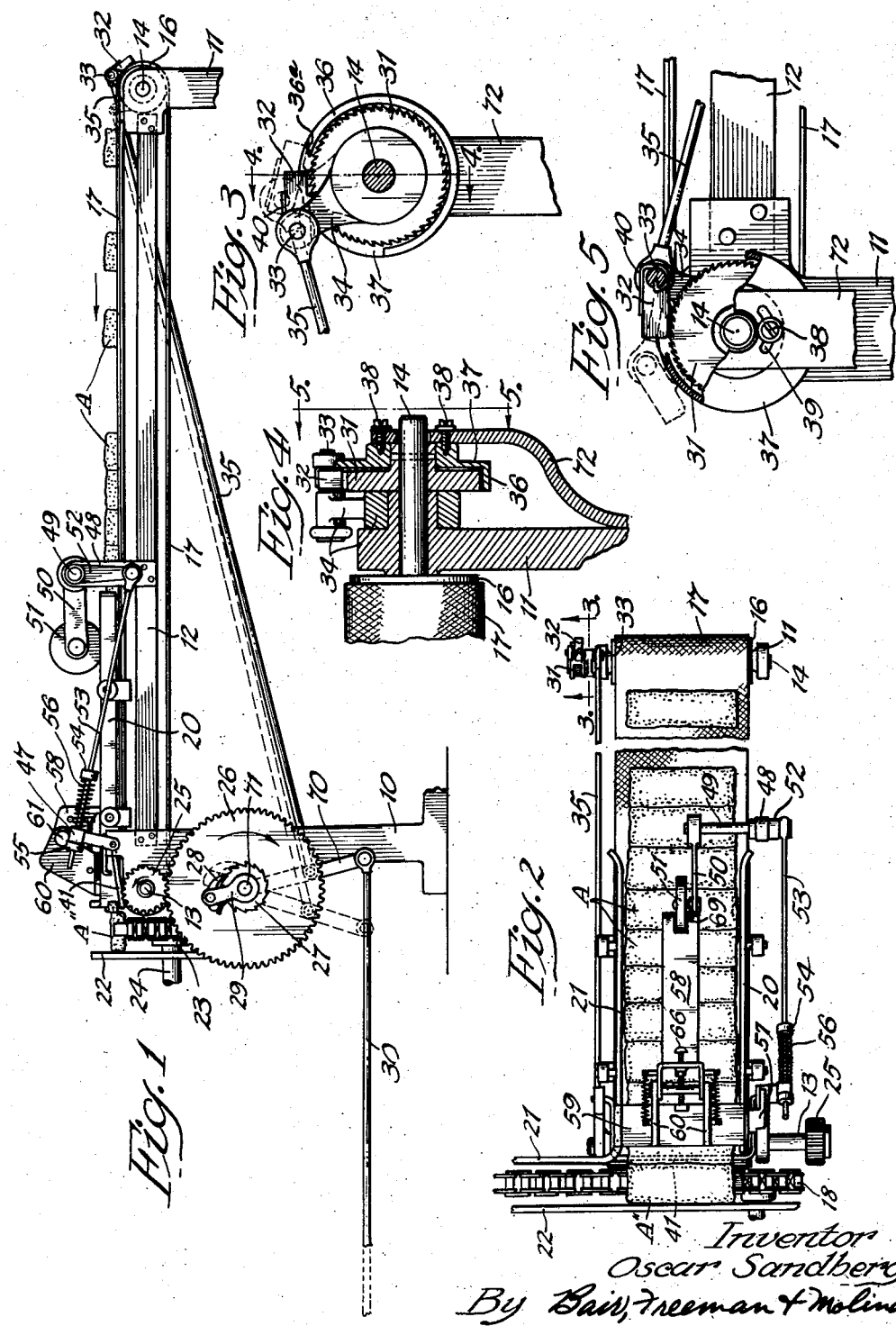
Inventor
Oscar Sandberg
By Baiv, Freeman + Molinare
Attys.

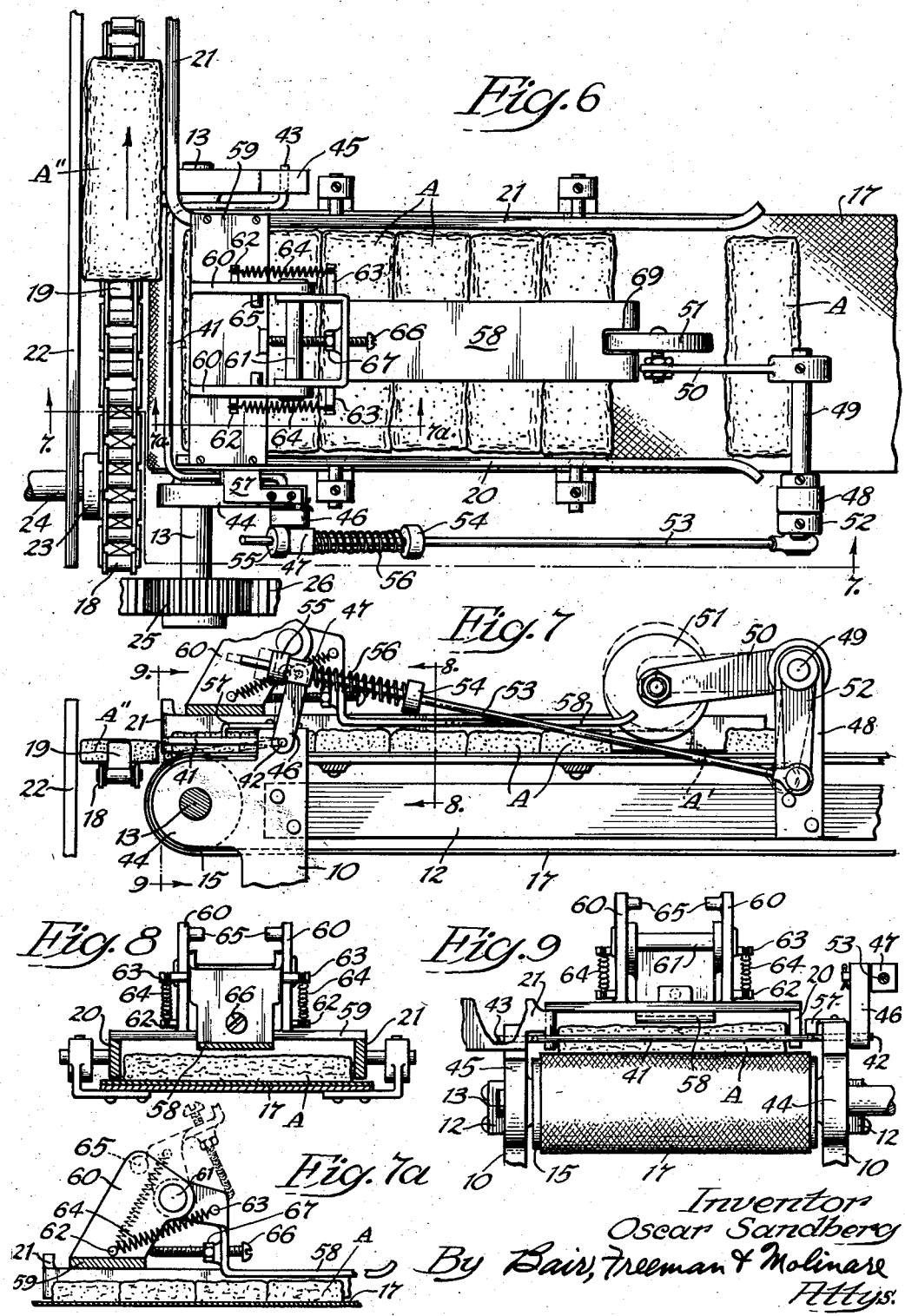

Patented Aug. 25, 1953

2,649,951

UNITED STATES PATENT OFFICE 2,649,951

ARTICLE FEED CONTROLLER

Oscar Sandberg, Toledo, Ohio, assignor to Lynch Corporation, Anderson, Ind., a corporation of Indiana Application May 20, 1950, Serial No. 163,259

5 Claims. (Cl. 198—21)

This invention relates to a controller for article feeding mechanisms, for instance for articles such as candy bars or the like that are fed to a wrapping machine for being wrapped thereby.

One object of the invention is to provide a controller for articles which are delivered by a feed conveyor to an intake conveyor of a wrapping machine, the controller mechanism being designed to prevent damage to the articles and insure that they are properly transferred from the feed conveyor to the intake conveyor and thereafter properly fed by the intake conveyor to the wrapping mechanism.

Another object is to provide mechanism for controlling articles on a feed conveyor so that the feeding of the articles therefrom to an intake conveyor is stopped whenever there is less than a predetermined number of articles in the feed conveyor, and the feed conveyor is arranged for slight retrograde movement each cycle of operation so as to permit the intake conveyor to take away the articles one at a time without interference by additional articles in the feed conveyor.

More specifically, it is an object of my present invention to provide an article holding means for the articles on a feed conveyor operable whenever there is less than a predetermined number of articles in a certain position on the feed conveyor, and to provide a ratchet mechanism for backing up the feed conveyor between intermittent periods of advancement thereof and at the proper time in relation to the intermittent motion of an intake conveyor so that the articles on the feed conveyor do not interfere with the movement of an article by the intake conveyor.

With these and other objects in view, my invention consists in the construction, arrangement and combination of the various parts of my article feed controller, whereby the objects contemplated are attained, as hereinafter more fully set forth, pointed out in my claims and illustrated in the accompanying drawings, wherein:

Figure 1 is a side elevation of an article feed controller embodying my present invention and showing it in operation.

Figure 2 is a plan view thereof, a portion of the feed conveyor being broken away to conserve space on the drawing.

Figure 3 is a vertical sectional view on the line 3—3 of Figure 2, the parts being shown on an enlarged scale.

Figure 4 is a detail vertical sectional view on the line 4—4 of Figure 3.

Figure 5 is a side elevation of Figure 4 taken on the indicated line 5—5 thereadjacent and showing the parts of Figure 3 from the reverse side.

Figure 6 is an enlarged plan view of the left hand end of Figure 2 showing the parts in a different position.

Figure 7 is an enlarged side elevation of the left hand end of Figure 1 showing the parts in a different position (corresponding to Figure 6).

Figure 7a is a view similar to Figure 7 showing a hold-down plate omitted from Figure 7.

Figure 8 is a vertical sectional view on the line 8—8 of Figure 7; and

Figure 9 is a front end view of the feed conveyor and associated mechanism taken on the indicated line 9—9 of Figure 7.

On the accompanying drawings I have used the reference numerals 10 and 11 to indicate vertical frame members for supporting a feed conveyor, the frame members being connected by a horizontal member 12. The frame members 10 and 11 rotatably support conveyor shafts 13 and 14 respectively on which are conveyor rollers 15 and 16. A feed conveyor belt 17 extends around the rollers for feeding articles A such as candy bars to an intake conveyor.

The intake conveyor comprises a chain 18 with lugs 19 spaced thereon and the chain is part of a wrapping machine such as one of the kind shown in my Patent No. 2,283,097, of May 12, 1942. On the present drawings, I show a sprocket 23 and a shaft 24 which are part of the wrapping machine. The feed conveyor and the intake conveyor are provided with side plates 20, 21 and 22 which guide the bars A in the usual manner.

The feed conveyor also may be part of the wrapping machine and driven intermittently in any suitable manner such as by means of a pinion 25 on the shaft 13 meshing with a gear 26 to which a ratchet wheel 27 is attached. A pawl 28 is provided for actuating the ratchet wheel and is pivoted to an arm 29 mounted on a rock shaft 71. An arm 70 behind the gear 26 in Figure 1 is secured to the rock shaft 71 and is oscillated by a reciprocating link 30 extending to some suitable cyclically operable part of the wrapping machine such as a cam follower, an eccentric, or a crank. Since the operating mechanism does not form any part of my present invention, it is not disclosed.

The ratchet mechanism 27—28—71—70—29 is adapted for propelling the feed conveyor 17 in the forward direction (toward the left in Figure 1). Propulsion occurs during substantially one-half the cycle of operation of the wrapping machine.

I also provide a back-up ratchet wheel 31 for the conveyor belt 17 and this wheel is mounted on the rear shaft 14. Cooperating with it is back-up pawl 32 normally engaged with the ratchet by a spring 40. The pawl is pivoted to a pin 33 extending from an arm 34 which is rockably mounted on the shaft 14 and rocking motion is imparted to it by a link 35 extending forwardly to the arm 70 with which it is pivotally connected. Thus the feed conveyor is caused to advance during substantially one-half the cycle and between the periods of advancement it is backed up for a purpose which will hereinafter appear.

The degree of backing up is much less than the degree of advancement. This is accomplished by means of a ratchet wheel cover 36 supported on a disc 37 and which has a cam surface 36a engaged by the pawl 32 as in the dotted position of Figure 3 when the arm 34 is rotating clockwise to retract the pawl from the teeth of the wheel 31 during the first part of the right hand rocking of the arm 34. During the last part, the pawl rides up on the ratchet wheel cover as shown by dotted lines in Figure 5 and thus the back-up motion is held down to just whatever is necessary for a purpose to be described later.

The ratchet wheel cover 36 can be adjusted so that the pawl 32 picks up the desired number of teeth on the wheel 31 and this is accomplished by clamp screws 38 through arcuate slots 39 of a stationary bracket 72, the screw being tightened after adjustment is made in order to retain the adjustment.

My article feed controller also includes an article-holding element 41 which may be in the form of a rod bent U-shaped as shown in Figure 6 and provided with pivot ends 42 and 43 mounted in brackets 44 and 45. The pivot end 42 has an actuating arm 46 secured thereto and a slide block 47 is pivoted to the arm 46.

A bracket 48 is supported on the frame member 12 and journals a rock shaft 49 on which a roller arm 50 is mounted. A roller 51 constitutes an article-engaged element and is journalled on the arm 50. Also attached to the rock shaft 49 is an arm 52 to which a link rod 53 is pivoted. The link rod slides through the slide bar 47 and is provided with a pair of collars 54 and 55. A spring 56 is interposed between the collar 54 and the slide block.

Referring to Figure 7, it is obvious that the weight of the roller 51 and the arm 50 tends to rock the bell crank 50—52 counter-clockwise and thus to swing the arm 46 clockwise. This tends to raise the article holder rod 41 to the position illustrated against a stop plate 57 therefor.

It will also be obvious that when a candy bar such as shown dotted at A' comes under the roller 51, it will raise it to the dotted position for lowering the article holder rod 41 to the dotted position.

A hold-down plate 58 is provided for those candy bars which have passed the roller 51. It is mounted on a cross bar 59 by means of a pair of brackets 60 which carry a pivot pin 61 for the plate 58.

Studs 62 extend from the bracket 60 and studs 63 extend from the plate 58, the studs 62 being connected with the studs 63 by over-center springs 64. The brackets 60 also include stop plugs 65 for the plate 58 when swung to the dotted position of Figure 7a, the spring 64 passing over center so as to hold the plate either down in the solid position or up in the raised position.

In the solid line position, the hold-down plate 58 is limited against contacting the candy bars A too tightly by an adjustable stop 66 in the form of a screw threaded through the bar 58. A lock nut 67 is provided for retaining the adjustment. The rear end of the plate is up-curved as at 68 and this portion of the plate is provided with a notch 69 for the roller 51.

*Practical operation*

In the feeding of candy bars and the like from a feed conveyor to an intake conveyor wherein the feed conveyor is a belt or the like that overfeeds the bars and slips under them when the first bar enters the intake conveyor and until said first bar is taken into the machine by the intake conveyor, two problems are presented. The first one is that when only a few bars such as two or three are on the feed conveyor, the friction of the bars with the conveyor is so small that the bars are sometimes not properly fed into the intake conveyor, that is, a bar may be fed only part way before the intake conveyor attempts to take it into the wrapping machine and part of the bar is then sheared off.

The second problem is that the friction of the second bar against the first bar in the intake conveyor due to the third bar and others behind it being crowded toward the intake conveyor by the feed conveyor slipping under them causes abrasion between the adjacent sides of the first and second bars when the intake conveyor moves the first bar into the wrapping machine. These abrasion marks are apparent in the finished product and sometimes, such as when peanuts or the like are part of the bars, a few of the kernels may be broken out producing an unsightly product and may damage some of them to the extent that they are unsaleable. Inspection is necessary for removing objectionable bars before they are packed in the cartons in which they are shipped out.

To overcome the first difficulty, I have provided an arrangement in the foregoing disclosed specification which insures a predetermined number of bars on the feed conveyor before the first one can enter the intake conveyor after the conveyor has been supplied with such predetermined number, and to overcome the second difficulty, I provide a back-up arrangement on the feed conveyor so that the two arrangements cooperate to control the feeding of articles in a desired manner, eliminating abraded and damaged bars and thus contributing to the efficiency of the wrapping machine.

To accomplish the desired results, the articles A are placed on the belt 17 either by hand, or by some automatic means. In Figure 1, I show bars A on the feed conveyor in random positions. When only six bars are on the feed conveyor as in Figures 6 and 7, the article engaged roller 51 drops to the lowered position thus raising the article holder rod 41 so that it holds these six bars against feeding into the intake conveyor. When a seventh bar is carried by the feed belt 17 under the roller 51, however, as in Figures 1 and 2, the roller will be raised as to the dotted position of Figure 7 which lowers the rod 41 to the position shown in Figure 1 and by dotted lines in Figure 7. The bars may then be fed into the intake conveyor as long as there are seven or more bars contacting side by side at the discharge end of the feed belt and of course there may be any number of additional bars behind the seventh one.

When the feed belt 17 is advanced by the pawl 28 and the ratchet 27, the first of the seven bars will be pushed into the feed conveyor as shown at A'' and the advancement of the belt 17 will continue a short period of time after the bar A'' is in the intake conveyor to insure its complete reception therein.

The advancement of the belt 17 will then cease and a retrograde movement will occur because of the ratchet arrangement at 31—32—36. The first part of the movement in the retrograde direction will come at the beginning of the clockwise rotation of the pawl 32 in Figure 3 so that the bar A next to A'' will be backed away from it slightly. As to the position illustrated in Figure 6, the parts are properly timed so that the intake conveyor then operates to move the bar A'' as it is doing in this figure so that the pressure of the seven or more bars against the bar A'' is thus relieved to prevent abrading the otherwise touching surfaces of the bar A'' and the next bar.

When the holder rod 41 is in the raised position of Figure 7 and there is no seventh bar to raise the roller 51, the roller will drop down and tend to lower the rod 41. If the rod is catching on any irregularities of the candy bar, however, energy will first be stored up in the relatively light spring 56 so as to gradually release the rod 41 from the bar instead of positively releasing it which would cause damage to the bar.

In the event that damaged candy bars reach a position under the hold-down plate 58 and the operator wishes to remove them, this plate can be swung back to the dotted position of Figure 7a to gain access to such bars. After the difficulty is remedied, then of course the hold-down plate can be swung back to the solid line position and the springs 64 in both positions will retain the plate either down with the stop screw 66 against the cross bar 59 or up with the portion of the plate 58 adjacent the pivot 61 engaging the stop lug 65.

From the foregoing specification it will be obvious that I have provided an article feed controller which contributes to the efficiency of a wrapping machine for the articles and prevents the possibility of damage to the articles caused by improper feeding thereof from the feed conveyor to the intake conveyor and undue friction between the first bar on the feed conveyor and the one in the intake conveyor.

It is also obvious that some changes, may be made in the construction and arrangement of the parts of my article feed controller without departing from the real spirit and purpose of my invention, and it is my intention to cover by my claims any modified forms of structure or use of mechanical equivalents which may be reasonably included within their scope.

I claim as my invention:

1. A feed controller of the character disclosed comprising a feed conveyor adapted to feed articles to an intake conveyor of a wrapping machine and to slip under the articles after the foremost one enters the intake conveyor, means to effect a back-up movement of said feed conveyor after said foremost article is fully entered into the intake conveyor so that the intake conveyor may move the article received therein out of alignment with said feed conveyor without said article being engaged by additional articles on said feed conveyor, and means to hold said articles from being fed by said feed conveyor into the intake conveyor until a predetermined number of articles are in a predetermined position on said feed conveyor and after the machine has been supplied with said predetermined number of articles in said predetermined position on said feed conveyor, said last means including an element normally riding said feed conveyor and an element operatively connected therewith and normally blocking movement of the articles, said first element being lifted by the last of said predetermined articles assuming a position interposed between it and said feed conveyor.

2. In a feed controller for articles to a wrapping machine, a feed conveyor adapted to feed articles to an intake conveyor and slip under the articles after the foremost one enters the intake conveyor, means to effect a back-up movement of said feed conveyor after said foremost article is fully entered into the intake conveyor, said means being operable before said intake conveyor moves the article out of alignment with said feed conveyor, and means to prevent feeding of articles from said feed conveyor to said intake conveyor when less than a predetermined number of articles is present on said feed conveyor and after the wrapping machine has been supplied with said predetermined number of articles on said feed conveyor, said last means comprising an article engaged element adapted to be engaged and moved by each article on the feed conveyor before it reaches the intake conveyor, an article holding element normally in position to engage the foremost article on the feed conveyor to thereby hold it and all articles behind it from being fed to said intake conveyor, and an operative connection between said article engaged element and said article holding element to move the holding element to non-holding position each time an article engages said article engaged element.

3. An article feed controller comprising a feed conveyor adapted to feed articles to an intake conveyor and slip under the articles after the foremost one enters the intake conveyor, ratchet means for operating said feed conveyor in a feeding direction during a portion of the cycle of operation of a wrapping machine to which the articles are fed, reverse ratchet means to effect movement of said feed conveyor in the opposite direction a distance less than in the forward direction after said foremost article is fully entered into said intake conveyor, the operation of one of said ratchet mechanisms being accomplished between the operations of the other, and means to prevent feeding of articles from said feed conveyor to said intake conveyor when less than a predetermined number of articles is present on said feed conveyor and after the wrapping machine has been supplied with said predetermined number of articles on said feed conveyor, said last means comprising an article engaged element adapted to be engaged and moved by the articles on the feed conveyor before they reach the intake conveyor, an article holding element normally in position to engage the foremost article on the feed conveyor to thereby hold it and all articles behind it from being fed to said intake conveyor, and an operative connection between said article engaged element and said article holding element to move the holding element to non-holding position when an article engages said article engaged element, said operative connection being of the lost-motion type biased in one direction to resiliently disengage said holding element from an article which it is holding.

4. In a feed controller for articles to a wrapping machine, a feed conveyor adapted to feed articles to an intake conveyor, means to effect a back-up movement of said feed conveyor after said foremost article is fully entered into said intake conveyor, means operable after said conveyor has been supplied with a predetermined number of articles to prevent feeding of articles from said feed conveyor to said intake conveyor when less than said predetermined number of articles is present on said feed conveyor, said last means comprising an article-engaged element normally resting on said feed conveyor and adapted to be engaged and lifted by an article on the feed conveyor assuming a position interposed between the two, an article holding element normally in position to engage the foremost article on the feed conveyor to thereby hold it and all articles behind it from being fed to said intake conveyor, and an operative connection between said article engaged element and said article holding element to move the holding element to non-holding position when an article engages said article engaged element.

5. In a feed controller for articles to a wrapping machine, a feed conveyor adapted to feed articles to an intake conveyor, means to effect a back-up movement of said feed conveyor after said foremost article is fully entered into said intake conveyor, means operable after said conveyor has been supplied with a predetermined number of articles to prevent feeding of articles from said feed conveyor to said intake conveyor when less than said predetermined number of articles is present on said feed conveyor, said last means comprising an article-engaged element normally resting on said feed conveyor and adapted to be engaged and lifted by an article on the feed conveyor assuming a position interposed between the two, an article holding element normally in position to engage the foremost article on the feed conveyor to thereby hold it and all articles behind it from being fed to said intake conveyor, and an operative connection between said article engaged element and said article holding element to move the holding element to non-holding position when an article engages said article engaged element, and a hold-down plate for said articles after they leave said article-engaged element, said hold-down plate being swingable to an inoperative position to permit access to said articles.

OSCAR SANDBERG.

References Cited in the file of this patent
UNITED STATES PATENTS

| Number | Name | Date |
| --- | --- | --- |
| 1,815,029 | Albertoli | July 21, 1931 |
| 1,904,613 | Braren | Apr. 18, 1933 |
| 2,141,226 | Rubel et al. | Dec. 27, 1938 |
| 2,301,543 | Hlavaty | Nov. 10, 1942 |